Jan. 19, 1971  M. J. ANTISDEL  3,556,911
INSULATION LAMINATOR APPARATUS

Filed May 27, 1968  2 Sheets-Sheet 1

INVENTOR.
MERLE J. ANTISDEL
BY
*John H. Widdowson*
ATTORNEY

United States Patent Office 3,556,911
Patented Jan. 19, 1971

3,556,911
INSULATION LAMINATOR APPARATUS
Merle J. Antisdel, Wichita, Kans., assignor to Wichita Sheet Metal Supply, Inc., Wichita, Kans.
Filed May 27, 1968, Ser. No. 732,323
Int. Cl. B32b 31/08, 31/20
U.S. Cl. 156—547                           3 Claims

ABSTRACT OF THE DISCLOSURE

This invention is a laminator apparatus operable to apply an adhesive to a facing material to be laminated onto insulation fiberglass material or the like. More particularly, this invention is a laminator apparatus having a control drive mechanism operable to achieve controlled speed of movement of the facing material and insulation material relative to the amount of adhesive material being applied thereto. Still, more specifically, this invention is an insulation laminator apparatus having a roll member to apply adhesive to the facing material and a scrapper bar assembly operable to assure precise thickness control and coverage of the adhesive material being applied thereto.

BACKGROUND OF THE INVENTION

Numerous types of machines are known to the prior art operable to automatically adhere a facing to a given material such as in the formation of padding or book covers. However, none of the prior art machines are operable to apply an adhesive materialto a facing material with uniform, controlled thickness and this is extremely important in operations of applying a vapor barrier protection to an insulation material in order to meet the required building and fire code regulations. Additionally, the prior art devices are not operable to compensate for the variation in speed caused by decreased diameters of material being applied from rotary mandrels and such is an important factor to achieve proper adhesive thickness.

In one preferred specific embodiment of this invention, an insulation laminator apparatus is provided having a basic frame means; a facing material spool assembly mounted on the frame means operable to supply a facing material into an adhesive applicator assembly; a guide roll member adapted to receive the facing material thereabout and direct the same upwardly between a compaction assembly operable to apply one side of the facing material having the adhesive thereon against an insulation material supplied to the compaction assembly from an insulation supply assembly; a finished product mandrel assembly adapted to receive the interconnected facing material and insulation thereabout from the compaction assembly; a control and power means connected to the finished product mandrel assembly in order to pull the interconnected insulation and facing material thereto; and a speed control assembly interconnected btween the adhesive applicator assembly and the compaction assembly to control relative speed thereof. More specifically, the adhesive applicator assembly includes an elongated adhesive roller movable and mounted within a trough-like adhesive container and having a scraper bar assembly mounted adjacent thereto. The scraper bar assembly is provided with an elongated scraper bar which is adjustable relative to the adhesive roller so as to control the amount of adhesive material on the outer periphery of the adhesive roller which is rotatable upwardly from the adhesive container. The compaction assembly and the adhesive roller are interconnected by the speed control assembly through a chain and sprocket drive assembly so that the speed of moving the finished product through the compaction assembly is inter-related to the speed of rotation of the adhesive roller so that the proper thickness of adhesive material is applied to the facing material. Additionally, an auxiliary agitator drive is interconnected through a chain sprocket and clutch mechanism to the adhesive roller so that the same is always maintained in continuous rotation to prevent adhesive material buildups thereon.

An object of this invention is to provide an insulation laminator apparatus overcoming the above-mentioned disadvantages of the prior art structures.

One further object of this invention is to provide an insulation laminator apparatus operable to apply an adhesive material of uniform controlled thickness to a facing material to be laminated under pressure with an insulation material such as fiberglass or the like.

One further object of this invention is to provide an insulation laminator apparatus having interconnected control drive means operable to maintain co-related movement of an insulation material and a facing material through an adhesive applicator assembly to achieve proper lamination and adhesive thickness.

Another object of this invention is to provide an insulation laminator apparatus having an auxiliary agitator drive means connected to an adhesive applicator assembly operable to maintain the same in continuous movement to prevent adhesive buildup material.

A still further object of this invention is to provide an insulation laminator apparatus resulting in a controlled adjustable thickness of adhesive material applied to a facing material; an interconnected control drive means operable to maintain relative conjoint rotation of the facing material and the insulation material being joined together; and such elements of the apparatus are reliable in operation, substantially maintenance free, and relatively inexpensive to manufacture.

Various other objects, advantages, and features of the invention will become apparent to those skilled in the art from the following discussion, taken in conjunction with the accompanying drawings, in which.

Figures 1, 2:
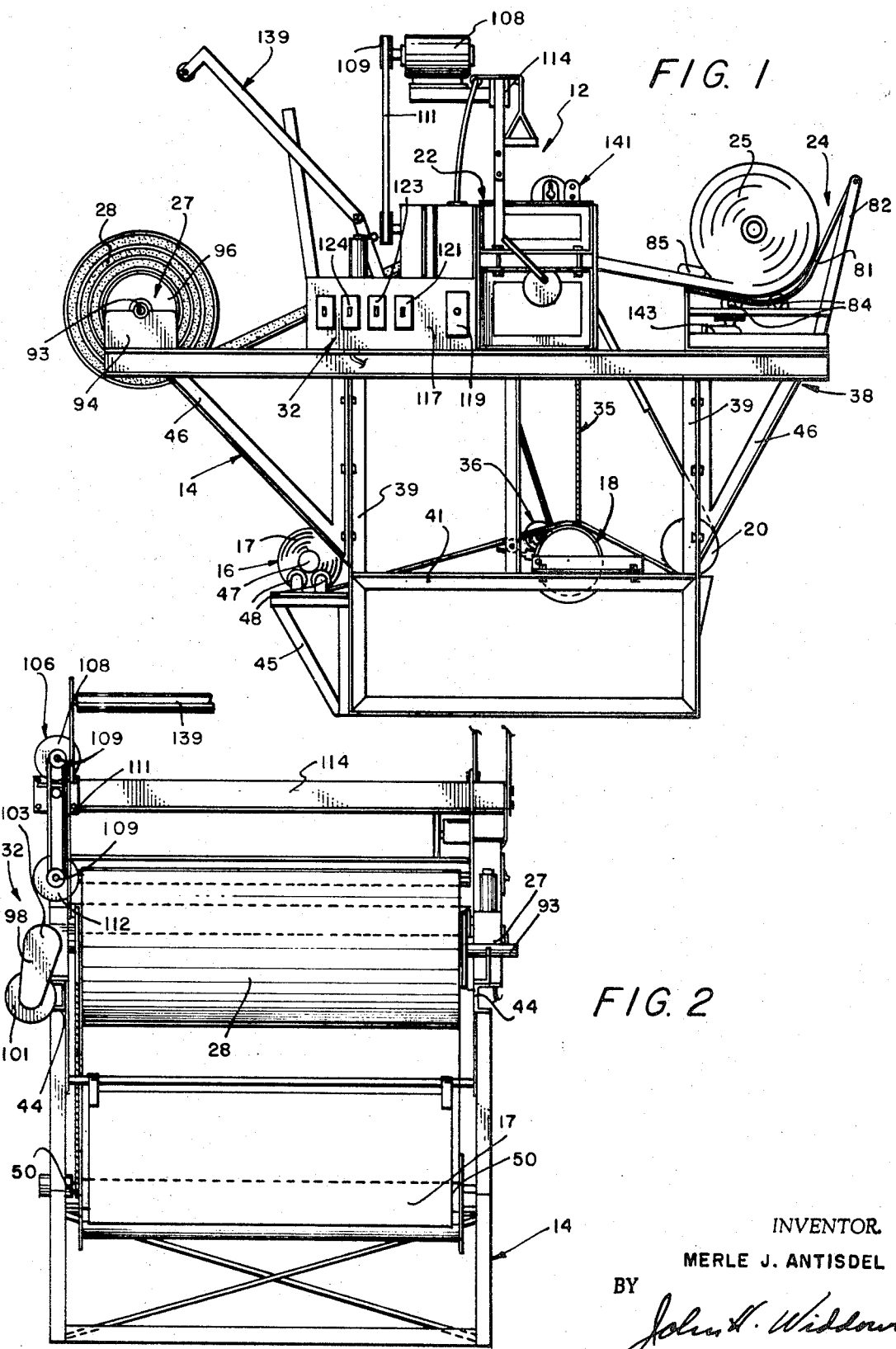
FIG. 1 is a side elevational view of the insulation laminator apparatus of this invention.
FIG. 2 is a fragmentary end elevational view of the insulation laminator apparatus of this invention.

The following is a discussion and description of preferred specific embodiments of the new insulation laminator apparatus of this invention, such being made with reference to the drawings, whereupon the same reference numerals are used to indicate the same or similar parts and/or structures. It is understood that such discussion and description is not to unduly limit the scope of the invention.

Referring to the drawings in detail and in particular to FIG. 1, an insulation laminator apparatus, indicated generally at 12, includes the following items mounted on a basic frame means 14, and all are interconnected and inter-related for controlled operation of the machine as will be explained. The items are as follows: (1) a facing material spool assembly 16 operable to carry and supply vinyl film, paper, aluminum foil, or other materials being a facing material 17; (2) an adhesive applicator assembly 18 operable to receive the facing material 17 to apply a uniform coating of adhesive thereto; (3) a guide roll assembly 20 operable to receive the facing material 17 having the adhesive thereon and train the same upwardly toward a compaction assembly 22; (4) an insulation supply assembly 24 operable to supply insulation material such as fiberglass insulation material 25 toward the compaction assembly 22; (5) the compaction assembly 22 having cooperating roller members operable to receive and compact the adhesive side of the facing material 17 with one side of the insulation material 25; (6) a finished product mandrel assembly 27 operable to receive laminated final material 28 thereon; (7) a control and power means 32 operable to drive the finished product mandrel assembly 27 to pull the insulation material 25 and facing material 17 from their respective sources; (8) a speed control assembly 35 interconnecting the adhesive applicator assembly 18 and the compaction assembly 22 for controlled interconnected movement thereof; and (9) an agitator drive mechanism 36 connected to the adhesive applicator assembly 18 to maintain rotational movement at all stages of operation to prevent adhesive buildup on a roller member as will be explained.

The basic frame means 14 includes a main support bed 38 mounted on upright support posts or channels 39; an intermediate support bed 41 interconnected between the support posts 39; and a mandrel support assembly 45 connected to one side of a pair of the upright support posts 39. The main support bed 38 is preferably constructed of elongated, parallel channel members 44 operable to provide a sturdy support area for the various aforementioned structures of this apparatus as will be explained. The outer ends of the support channels 44 are given an additional rigidity as by strut members 46 secured as by bolts 48 to the upright support posts 39.

The facing material spool assembly 16 includes an elongated roll of the facing material 17 mounted on a shaft member 47 having opposite ends rotatably mounted on cooperating pairs of spaced bearing members 48 which are secured to the upper surface of the mandrel support assembly 45. The shaft member 47 may be provided with a plurality of movable control collars 50 thereon when using a facing material 17 of various widths to prevent the same from moving axially. It is obvious that the facing material 17 may be of a paper, aluminum foil, a plastic or vinyl film, or other similar materials. It is seen that the shaft member 47 is easily rotatable on the bearing members 48 so that the facing material 17 is easily pulled therefrom and trained toward the adhesive applicator assembly 18.

Figure 3:
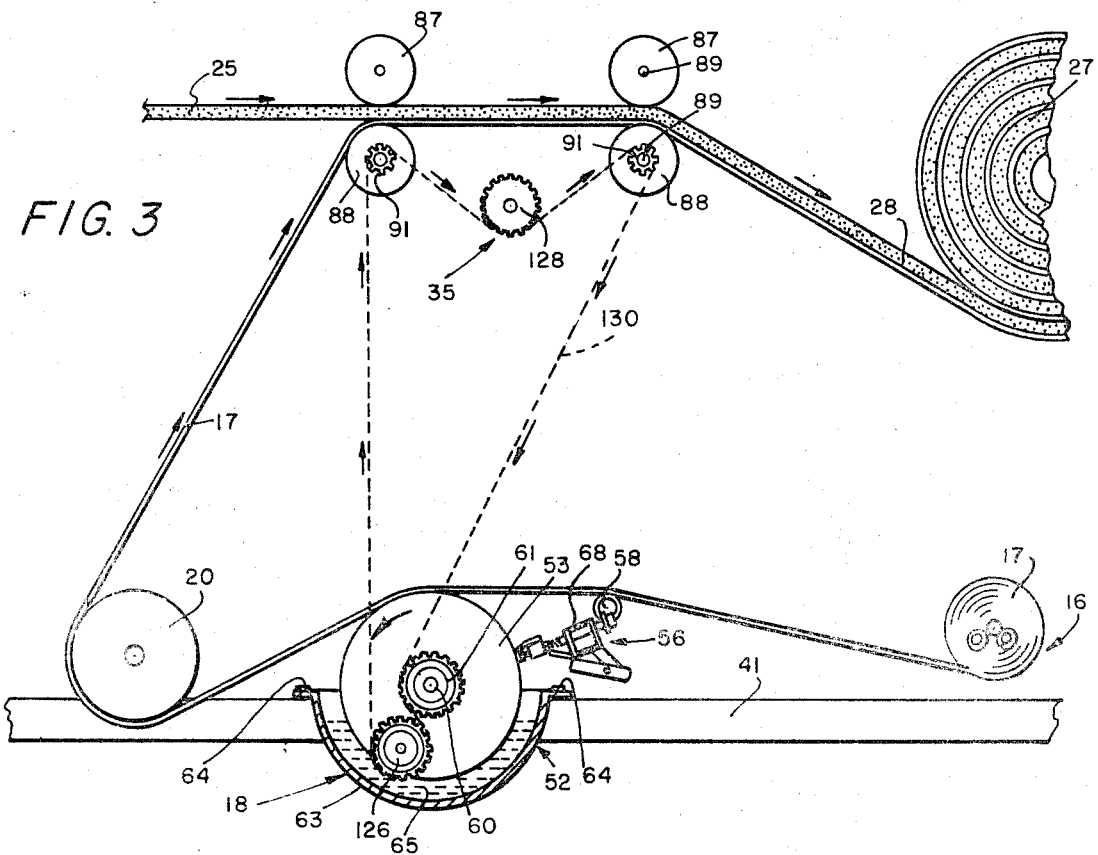
FIG. 3 is a fragmentary schematic diagram illustrating the operation of the insulation laminator apparatus of this invention.
Figure 4:
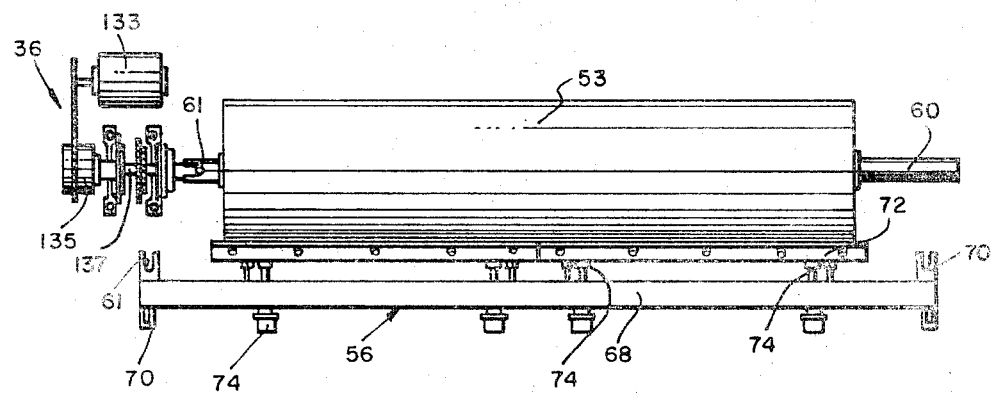
FIG. 4 is a fragmentary top elevational view illustrating an adhesive applicator assembly of the laminator apparatus of this invention.

As shown in FIGS. 3 and 4, the adhesive applicator assembly 18 includes an adhesive container assembly 52 secured to the intermediate support bed 41; and adhesive roller member 53 secured to upright channel members 54 forming part of the intermediate support bed 41; a scraper bar assembly 56 secured to the frame means 14 and spaced outwardly relative to the adhesive roller member 53; and a guide roller 58 placed on the input side of the adhesive roller member 53 as will be explained. The adhesive roller member 53 is mounted on an axially extended shaft 60 rotatably mounted on the channel members 54 having a gear member 61 on one outer end of the shaft 60 for connection to the speed control assembly 35 as will be explained. The adhesive container assembly 52 is provided with a semi-circular, trough-like container 63 secured as by bolt members 64 to the intermediate support bed 41. The container 63 is adapted to receive an adhesive therein indicated generally at 65 (FIG. 3) with the lower half of the adhesive roller member 53 rotatable within the container 63 to pick up the adhesive 65 therefrom. The adhesive roller member 53 is preferably constructed of an aluminum material and having outer ends of the shaft 60 mounted in bearing members 67 for controlled rotation as will be explained.

The scraper bar assembly 56 includes an elongated support tube member 68 having its opposite ends secured as by brackets 70 and bolt members to the channel members 54. A scraper bar 72 is interconnected as by spring and tube assemblies 74 to the tube member 68. The scraper bar 72 is of a blade-like structure resiliently held in an adjusted position relative to the adhesive roller member 53 so as to maintain and control the thickness of the adhesive 65 picked up from the container 63 on the roller member 53. It is seen that the scraper bar 72 is adjustably movable relative to the adhesive roller member 53 so that the desired thickness of the adhesive material may be applied to the facing material 17.

The facing material 17 is first trained over the elongated guide roller 58 which is connected for rotation to the outer upright support posts 39. This operates to place the facing material 17 in the proper vertical relationship for contact with the upper surface of the adhesive roller member 53 as will be explained.

The insulation supply assembly 24 includes an arcuately shaped cradle member 81 secured as by support members 82 to an upper surface of the support bed 38. Additionally, the insulation supply assembly 24 includes a pair of parallel elongated roller members 84 having their upper peripheral surfaces extended within the cradle member 81 for contact with the insulation material 25 for easy rotational movement thereon. Additionally, a tension bar member 85 is provided at the forward portion of the cradle member 81 in order to provide the proper resistance to movement with the insulation material 25 from the cradle member 81 and also is operable to maintain the large roll of insulation material on the cradle member 81 when pulling the same to the compaction assembly 22 as will be explained.

As shown in FIG. 3, the compaction assembly 22 includes two sets of inter-related upper and lower compression rolls 87 and 88, respectively, preferably constructed of aluminum material and each having an elongated shaft member 89 which is rotatably connected to the frame means 14 at opposite ends thereof. The first set of upper and lower compression rolls 87 and 88 is adapted to receive the facing material 17 having the adhesive 65 thereon in abutting engagement with the lower surface of the insulation material 25 supplied thereto from the cradle member 81. It is obvious that the relative radial spacing of the cooperating compression rolls 87 and 88 can be adjusted depending on the thickness of the insulation material 25 and amount of compaction required. The outer ends of a common side of the lower compression rolls 88 are provided with gear members 91 for reasons to be explained. After the laminated facing material 17 and insulation material 25 is trained from the last pair of compression rolls 87 and 88, the same is fed into the finished product mandrel assembly 27.

The finished product mandrel assembly 27 includes an elongated drive shaft member 93 mounted upon upright bearing members 94 having outer facing plates 96 axially adjustable on the shaft member 93 to maintain the finished product, being laminated insulation, 28 in the proper relationship. One end of the shaft member 93 is interconnected to a drive means 98 which is a part of the control and power means 32. The drive means 98 includes a drive motor 101 interconnected to a sprocket assembly or gear box 103 to rotate the drive shaft member 93 so that this provides a main driving force for pulling the facing material 17 and the insulation material 25 off their respective storage positions through the adhesive applicator assembly 18 and the compaction assembly 22. It is obvious that a substantial amount of laminated insulation 28 can be mounted upon the finished product mandrel assembly 27; however, a rotary shear assembly 106 is operable to cut same any desired length as required.

The rotary shear assembly 106 includes a motor member 108 interconnected as by pulleys 109 and a belt member 111 to a cutting blade member 112, the entire assembly which is longitudinally movable on an upright support beam 114. It is operable to move the blade member 112 transversely of the laminated insulation 28 for cutting the same to desired lengths.

The control and power means 32 includes a main control panel 117 having a plurality of operational switches on there such as an on-off switch 119; a main drive motor control switch 121; and agitator drive motor switch 123, and a safety switch 124. Additionally, it is obvious that a foot operated switch control could be used to operate the drive means 98 of the finished product mandrel assembly 27 so that the operation is controlled at all times for a safety feature in case an operator becomes entangled in the apparatus 12.

As shown in FIG. 3, the speed control assembly 35 includes the gear member 61 mounted upon an outer end of the shaft 60 of the adhesive applicator assembly 18; a reversing sprocket member 126 mounted adjacent the gear member 61 and secured to the frame means 14 for rotational movement; an adjustable tension gear 128 mounted on the frame means 14 to regulate tension as will become obvious; and a chain member 130 trained about the gear members 91 on the lower compression rolls 88, the tension gear 128, the gear member 61, and the reversing sprocket member 126. It is seen, therefore, that movement of the insulation material 25 and the facing material 17 through the upper and lower compression rolls 87 and 88 operates to rotate the same and such movement is transferred through the chain member 130, the gear members and the sprocket so that the adhesive roller member 53 is maintained at the proper rotation speed to apply the desired amount of adhesive 65 to the facing material 17 through this interconnection. It is seen that the tension gear 128 can be moved vertically to maintain the proper tension on the chain member 130. It is seen that this speed control assembly 35 is very desirable and necessary as the changing diameters of the roll of facing material 17 relative to the insulation material 25 from its rolled condition creates problems in maintaining the proper relationship of the speed of the material being moved in order to assure the proper amount of adhesive being applied to the facing material 17.

As shown in FIG. 4, the agitator drive assembly 36 includes an electric motor 133 mounted on the frame means 14 and interconnected as through a clutch assembly 135 and a shaft member 137 to the outer end of the shaft 61 of the adhesive roller member 53. The motor 133 is of a low rotational speed type operable to apply rotation to the adhesive roller member 53 at all times, but the clutch assembly 135 permits the same to be rotated at the operating speed of the entire apparatus 12 and over-ride this mechanism during production. Therefore, it is seen that the agitator drive assembly 36 merely provides a secondary driving force to the adhesive roller member 53 to maintain rotation at all times during operation so that the adhesive is not permitted to build-up on the adhesive roller member in order to apply uniform thickness of adhesive to the facing material 17.

Additionally, various features are provided in the laminator apparatus 12 which are not deemed to have patentability thereto such as a compacting regulator assembly 139 operable to maintain the finished product in a compact position and a counter assembly 141 operable to measure the lineal feet of insulation material 25 moving through the compaction assembly 22. A plurality of heat lamp members 143 are connected to the basic support frame means 14 operable to apply heat to the outer surface of the facing material 17 having adhesive thereon to help in curing the same prior to jointing with the insulation material 25 as will be explained. Also, additional cutters can be provided in order to slice the insulation material longitudinally as desired to achieve any given width.

In the use and operation of the insulation laminator apparatus 12 of this invention, it is seen that the spool of facing material 17 is placed about the shaft 48 and is trained therefrom over the guide roller 58 into contact with the outer upper periphery of the adhesive roller member 53 for movement toward the guide roller 20. It is seen that the non-adhesive side of the facing material 17 contacts the outer periphery of the guide roller 20 and whereupon the same is moved upwardly past the heat lamp members 143 into the first set of upper and lower compression rolls 87 and 88. At the same time, the insulation material 25 is trained from the support cradle member 81 through the pair of compression rolls 87 and 88. The interconnected laminated insulation 28 is thereupon trained about the finished product mandrel assembly 27 for wrapping upon the shaft 93. The drive means 32 is operably connected to the shaft 93 of the finished product mandrel assembly 27 to provide the operating force for pulling the insulation material 25 and facing material 17 through the aforementioned steps.

It is seen that the scraper bar assembly 36 is adjustably movable relative to the outer periphery of the adhesive roller member 53 so that the thickness of the adhesive 65 picked upon by movement of the adhesive roller member 53 through the container 63 is closely controlled and assures an even spreading of same along the entire surface of the adhesive roller. It is also seen that the outer scraper bar 72 is spring biased into its operating position so that it is movable under heavy pressure to prevent damage to the adhesive roller member 53. The speed control assembly 35 operates through the chain member 130 to maintain proper rotational speed of the adhesive roller member 53 relative to the compression rolls 87 and 88 for proper operation thereof. The agitator drive assembly is operable through the clutch assembly 135 to maintain rotation of the adhesive roller member 53 during times of inoperation so as to prevent adhesive build-up upon the outer surface which is extremely important to maintain controlled, accurate operation of the apparatus 12 without malfunction.

As will be apparent in the foregoing description of the applicant's insulation laminator apparatus, relatively inexpensive means have been provided to place a controlled amount of adhesive material upon a facing material so as to meet certain building and structural requirements. This operation of laminating a facing material to an insulation material to provide a vapor barrier must be rigidly controlled in order to receive proper approval for building uses and the accurate application of adhesive material is a fundamental requirement of receiving the proper building code and construction approvals.

While the invention has been described in conjunction with preferred specific embodiments thereof, it will be understood that this description is intended to illustrate and not to limit the scope of the invention, which is defined by the following claims.

I claim:

1. A laminator apparatus adapted for use to secure a facing material and an insulation or the like material, comprising:
   (a) frame means,
   (b) means for mounting a facing material holding means on said frame means, said holding means having a facing material thereon adapted to be trained therefrom;
   (c) adhesive applicator means having an adhesive container, an adhesive applicator member rotatably mounted so as to have a portion thereof mounted to receive adhesive material thereon, and a guide means operable to receive said facing material to maintain the same in contact with an upper surface of said adhesive applicator member;
   (d) guide means mounted on said frame means to train said facing material having the adhesive thereon;

(e) insulation supply means operable to carry insulation material thereon for training the same toward engagement with the facing material;
(f) means operable to bring together said facing material and insulation material together being a compaction assembly;
(g) a finished product mandrel-like assembly having a means operable to receive the laminated insulation thereabout;
(h) said finished product mandrel assembly connected to a power means to pull the insulation material and facing material thereto, and
(i) a speed control assembly connected to said compaction assembly and said adhesive applicator means driven by rotation of said finished product mandrel assembly operable to correlate movement of said facing material and insulation material to rotation of said adhesive aplicator member to assure proper application of the adhesive on said facing material regardless of diameter of the facing material and insulation material on said finished product mandrel assembly.

2. A laminator apparatus as described in claim 1, including:
(a) said compaction assembly having upper and lower compression roll members operable to compact the insulation material and facing material as it moves therebetween, and
(b) said speed control assembly having gearing means connected to one of said compression roll members, a tension gearing means member connected to said frame means, an outer gearing means connected to said adhesive applicator, and means to inter-connect said gearing means, said tension gearing means and said outer gearing means, whereby said upper and lower compression roll members and said adhesive applicator are movable at controlled inter-related speeds to apply the proper thickness of adhesive to the facing material.

3. A laminator apparatus as described in claim 1, including:
(a) an agitator drive means connected through an over-ride clutch assembly to said adhesive applicator member, and having a motor means connected thereto and said adhesive applicator member is maintained at slow speed of rotation even when said apparatus is inoperative in not supplying the facing material onto the insulation material to prevent an adhesive material build-up on the outer surface of said adhesive applicator member.

References Cited

UNITED STATES PATENTS

| | | | |
|---|---|---|---|
| 2,077,535 | 4/1937 | Smith | 156—549X |
| 2,800,946 | 7/1957 | Steffen | 156—495X |
| 3,023,128 | 2/1962 | Affelder | 117—111(F) |
| 3,194,210 | 7/1965 | Harris | 118—261X |

BENJAMIN A. BORCHELT, Primary Examiner

J. M. HANLEY, Assistant Examiner

U.S. Cl. X.R.

156—495, 550